United States Patent
Nonaka et al.

(10) Patent No.: US 8,090,158 B2
(45) Date of Patent: Jan. 3, 2012

(54) IMAGE EVALUATION APPARATUS, METHOD, AND PROGRAM

(75) Inventors: Shunichiro Nonaka, Asaka (JP); Yousuke Shirahata, Kawasaka (JP)

(73) Assignee: Fujifilm Corporation, Tokyo (JP)

( * ) Notice: Subject to any disclaimer, the term of this patent is extended or adjusted under 35 U.S.C. 154(b) by 1132 days.

(21) Appl. No.: 11/905,121

(22) Filed: Sep. 27, 2007

(65) Prior Publication Data

US 2008/0080749 A1    Apr. 3, 2008

(30) Foreign Application Priority Data

Sep. 28, 2006  (JP) ................ 2006-263844

(51) Int. Cl.
*G06K 9/00* (2006.01)
(52) U.S. Cl. ................ 382/115; 382/118
(58) Field of Classification Search ........... 382/115, 382/118, 295, 296, 297
See application file for complete search history.

(56) References Cited

U.S. PATENT DOCUMENTS

| 7,433,518 B2 | 10/2008 | Shiratani |
| 2002/0181784 A1 | 12/2002 | Shiratani |
| 2005/0089246 A1 | 4/2005 | Luo |

FOREIGN PATENT DOCUMENTS

| JP | 8-138024 A | 5/1996 |
| JP | 2002-10179 A | 1/2002 |
| JP | 2002-358522 A | 12/2002 |
| JP | 2004-361989 A | 12/2004 |
| JP | 2005-20446 A | 1/2005 |
| JP | 2005-129070 A | 5/2005 |
| JP | 2005-148915 A | 6/2005 |
| JP | 2005-148916 A | 6/2005 |

*Primary Examiner* — Brian Le

(74) *Attorney, Agent, or Firm* — Birch, Stewart, Kolasch & Birch, LLP

(57) ABSTRACT

An image evaluation apparatus and method capable of performing image evaluation more precisely using face information included in an image. An information obtaining unit obtains information with respect to at least one of the following face characteristics from an image including a face: face size, face position in the image, face orientation, face rotation angle, face-to-face positional relationship when a plurality of faces is included in the image, and face detection score. Then, an evaluation value calculation unit calculates an evaluation value representing an evaluation result of the image based on the information of the at least one of the face characteristics of face size, face position in the image, face orientation, face rotation angle, face-to-face positional relationship when a plurality of faces is included in the image, and face detection score obtained by the information obtaining unit.

9 Claims, 10 Drawing Sheets

| FACE ORIENTATION | EVALUATION VALUE | LUT4 |
|---|---|---|
| SIDE FACE | 0.29 | |
| FRONT FACE | 0.43 | |

FIG.8  FACE ROTATION ANGLE

| CHARACTERISTICS | INDIVIDUAL EVALUATION VALUES | WEIGHTING FACTORS | |
|---|---|---|---|
| SIZE | 0.42 | 0.12 | 0.0504 |
| POSITION (x DIRECTION) | 0.41 | 0.09 | 0.0369 |
| POSITION (y DIRECTION) | 0.4 | 0.06 | 0.024 |
| ORIENTATION | 0.43 | 0.08 | 0.03225 |
| ROTATION ANGLE | 0.4 | 0.06 | 0.024 |
| FACE-TO-FACE RELATIONSHIP | 0.45 | 0.06 | 0.027 |
| DETECTION SCORE | 0.35 | 0.12 | 0.042 |
| SIZE AND POSITION(x DIRECTION) | 0.32 | 0.10 | 0.032 |
| SIZE AND POSITION(y DIRECTION) | 0.38 | 0.10 | 0.038 |
| OVERALL EVALUATION VALUE | | | 0.33655 |

IMAGE EVALUATION APPARATUS, METHOD, AND PROGRAM

BACKGROUND OF THE INVENTION

1. Field of the Invention

The present invention relates to an image evaluation apparatus and method for evaluating an image using a face included in the image. It also relates to a program for causing a computer to perform the image evaluation method.

2. Description of the Related Art

Recently, the wide spread use of digital cameras, along with a dramatic increase in the capacity of image recording media, has made it possible for users of digital cameras to record a large number of images on a single image recording medium. At the same time, this has caused the users troublesome efforts to select images to be processed from a huge number of images when, for example, placing a print order or the like. As such, in order to allow the users to efficiently select images, a function to make a short list of images based on certain conditions before the final decision for printing is made by the user or a function to select appropriate images for printing according to user preference is demanded.

For example, Japanese Unexamined Patent Publication No. 2002-010179 proposes a method in which an image is evaluated using one of image brightness, acceleration sensor output, and AF evaluation as the reference and an inappropriate image for printing is automatically excluded based on the evaluation result.

Further, Japanese Unexamined Patent Publication No. 2004-361989 discloses a method in which the orientation of a human face included in an image is determined, and an image evaluation value is calculated based on the determination result, then a desired image is selected from a plurality of images based on the calculated evaluation value.

Still further, U.S. Patent Application Publication No. 20020181784 discloses a method that evaluates an image using a comprehensive evaluation result, which is a summation of a plurality of evaluation items, including face proportion in the image, eye opening degree, face orientation, focus, image shake, image brightness, and the like.

Further, U.S. Patent Application Publication No. 20050089246 proposes a method in which a characteristic vector representing image quality is calculated for a face region included in an image, and the image quality of the face region is evaluated using the calculated characteristic vector.

As described above, many different types of image evaluation methods that perform image evaluation based on a face included in an image are proposed. The methods described in the aforementioned patent publications, however, perform image evaluation by simply calculating an evaluation value of each evaluation item. That is, the subjective evaluation of an image viewer is not necessarily reflected in the evaluation, so that there may be cases where the calculated evaluation differs from the evaluation of the image viewer.

SUMMARY OF THE INVENTION

The present invention has been developed in view of the circumstances described above, and it is an object of the present invention to provide an image evaluation apparatus and method capable of evaluating an image more accurately using face information included in the image. It is a further object of the present invention to provide a program for causing a computer to perform the image evaluation method.

The image evaluation apparatus of the present invention is an apparatus, including:

an information obtaining means for obtaining information with respect to at least one of the following face characteristics from an image including at least one face: face size, face position in the image, face orientation, face rotation angle, face-to-face positional relationship when a plurality of faces is included in the image, and face detection score; and an evaluation value calculation means for calculating an evaluation value statistically representing an evaluation result of the image based on the obtained information.

The referent of "evaluation value" as used herein means a predicted value calculated so as to have a correlation with a possible evaluation level of a user who wants to evaluate an image, and not a value quantitatively calculated from the image, such as a characteristic vector, S/N ratio, resolution, or the like of the image.

The referent of "statistically" as used herein means, when calculating the evaluation value, to inductively obtain evaluation values of images selected, as desirable, from multitudes of sample images as correct data, and not to deductively obtain evaluation values based on several assumptions. Preferably, evaluation values obtained by evaluators by actually evaluating the sample images are used as the correct data. Further, the number of sample images for obtaining evaluation values is not less than 300, and preferably not less than 1000.

As for the "face-to-face positional relationship when a plurality of faces is included in the image", the angle formed between the line segment connecting the center point of an evaluation target face of a plurality of faces with the center point of each of other faces and a horizontal line of the image may be used.

In the image evaluation apparatus of the present invention, the information obtaining means may be a means for obtaining information with respect to a plurality of mutually related characteristics of the face characteristics of face size, face position in the image, face orientation, face rotation angle, face-to-face positional relationship when a plurality of faces is included in the image, and face detection score; and the evaluation value calculation means may be a means for calculating a statistical evaluation result, which is based on the information representing the mutually related characteristics, as the evaluation value.

Further, in the image evaluation apparatus of the present invention, the information obtaining means may be a means for obtaining information with respect to at least one of the following face characteristics: face size, face position in the image, face orientation, face rotation angle, face-to-face positional relationship when a plurality of faces is included in the image, and face detection score, as well as information with respect to a plurality of mutually related characteristics of these face characteristics; and the evaluation value calculation means may be a means for calculating an overall evaluation result obtainable from a statistical evaluation result, which is based on the information representing the at least one of the face characteristics, and a statistical evaluation result, which is based on the information representing the mutually related characteristics, as the evaluation value.

The image evaluation method of the present invention is a method including the steps of:

obtaining information with respect to at least one of the following face characteristics from an image including at least one face: face size, face position in the image, face orientation, face rotation angle, face-to-face positional relationship when a plurality of faces is included in the image, and face detection score; and calculating an evaluation value statistically representing an evaluation result of the image based on the obtained information.

The image evaluation method of the present invention may be provided in the form of a program for causing a computer to perform the method.

According to the present invention, information with respect to at least one of the following face characteristics is obtained from an image including at least one face: face size, face position in the image, face orientation, face rotation angle, face-to-face positional relationship when a plurality of faces is included in the image, and face detection score, and an evaluation value statistically representing an evaluation result is calculated. This may reflect the preference of an image viewer, and thereby the image may be evaluated more precisely.

Further, by obtaining information with respect to a plurality of mutually related characteristics of the face characteristics of face size, face position in the image, face orientation, face rotation angle, face-to-face positional relationship when a plurality of faces is included in the image, and face detection score; and calculating a statistical evaluation result based on the information of the mutually related characteristics as the evaluation value, image evaluation with detailed conditions may be performed, which is not feasible by the information representing the face size, face position of the image, face orientation, face rotation angle, face-to-face positional relationship when a plurality of faces is included in the image, or face detection score alone.

Still further, by obtaining information with respect to at least one of the following face characteristics: face size, face position in the image, face orientation, face rotation angle, face-to-face positional relationship when a plurality of faces is included in the image, and face detection score, as well as information with respect to a plurality of mutually related characteristics of these face characteristics, and calculating an overall evaluation result obtainable from a statistical evaluation result, which is based on the information representing the at least one of the face characteristics, and a statistical evaluation result, which is based on the information of the mutually related characteristics, as the evaluation value, the image may be evaluated more precisely.

BRIEF DESCRIPTION OF THE DRAWINGS

FIG. 8 illustrates an evaluation value table LUT5 for face rotation angle.

DESCRIPTION OF THE PREFERRED EMBODIMENTS

Figure 1:
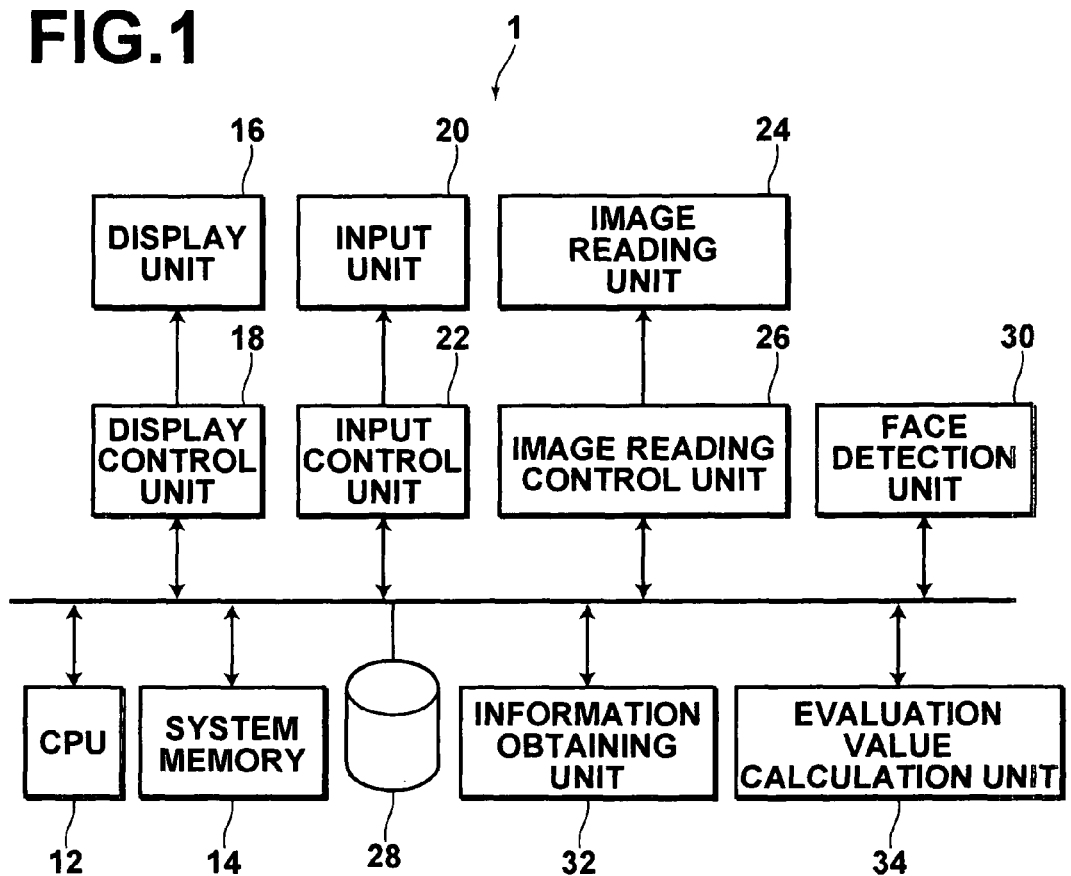
FIG. 1 is a schematic block diagram of an image evaluation apparatus according to a first embodiment of the present embodiment, illustrating the construction thereof.

Hereinafter, exemplary embodiments of the present invention will be described with reference to the accompanying drawings. FIG. 1 is a schematic block diagram of an image evaluation apparatus according to a first embodiment of the present embodiment, illustrating the construction thereof. As illustrated in FIG. 1, the image evaluation apparatus 1 of the present embodiment includes: a CPU 12 that performs various control operations on image data, including record and display control operations, as well as controlling each unit of the image evaluation apparatus 1; a system memory 14 that includes a ROM having therein a program for causing the CPU 12 to operate, viewer software for viewing images, and various constants, and a RAM serving as a work area for the CPU 12 when performing processing; a display unit 16 that includes, for example, a liquid crystal display for performing various display operations; a display control unit 18 that controls the display unit 16; an input unit 20 that includes a keyboard, mouse, touch panel, and the like for giving instructions and performing various input operations to the apparatus 1; and an input control unit 22 that controls the input unit 20.

The image evaluation apparatus 1 further includes: an image reading unit 24 that reads out image data from a recording medium, such as a memory card having thereon image data representing an image, or the like, or records image data on a recording medium; an image reading control unit 26 that controls the image reading unit 24; and a hard disk 28 for storing various types of information, including image data, evaluation value tables to be described later, and the like.

The image evaluation apparatus 1 further includes: a face detection unit 30 that detects a face from an image; an information obtaining unit 32 that obtains information with respect to face characteristics; and an evaluation value calculation unit 34 that calculates an evaluation value indicating an evaluation result for an image based on the information obtained by the information obtaining unit 32.

Hereinafter, functions of the face detection unit 30, information obtaining unit 32, and evaluation value calculation unit 34 will be described along with a process performed in the present embodiment.

Figure 2:
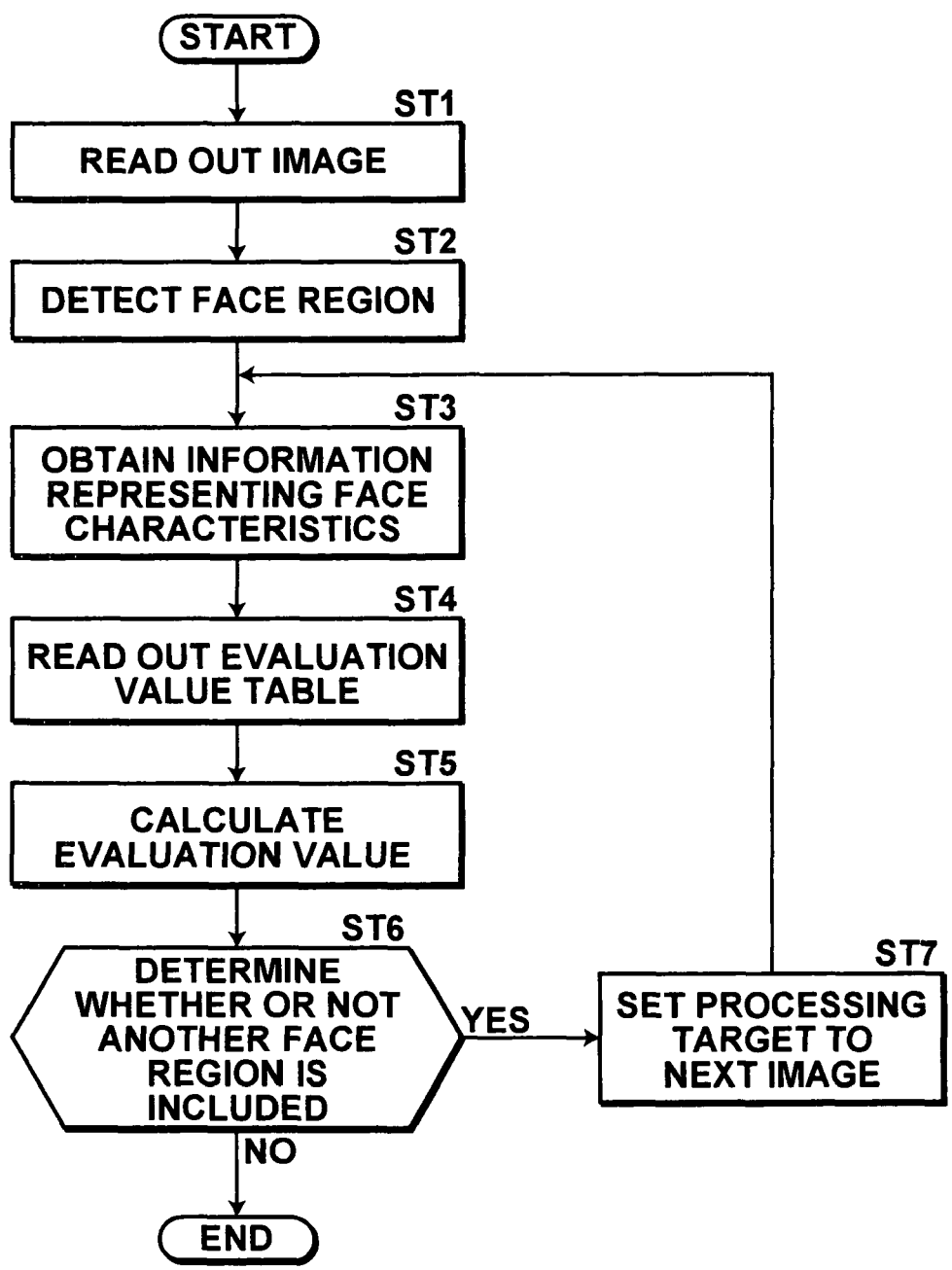
FIG. 2 is a flowchart illustrating an image evaluation process performed in the first embodiment of the present invention.

FIG. 2 is a flowchart illustrating an image evaluation process performed in the first embodiment of the present invention. In the first embodiment, the apparatus calculates an evaluation value of an image based on information representing characteristics of a face, i.e., information with respect to any one of the following face characteristics: face size, face position in the image, face orientation, face rotation angle, face-to-face positional relationship when a plurality of faces is included in the image, and face detection score. In the following, description will be made of how to calculate the evaluation value from each of the face characteristics of face size, face position in the image, face orientation, face rotation angle, face-to-face positional relationship when a plurality of faces is included in the image, and face detection score. Here, it is assumed that an evaluation target image is already read in by the image reading unit 24 and stored in the hard disk 28.

When an instruction to start image evaluation is given by an operator through the input unit 20, the CPU 12 initiates the process. First, the CPU 12 reads out a processing target image from the hard disk 28 (step ST1), and the face detection unit 30 detects a face region of a person from the image (step ST2). More specifically, the following method is used, in which a pattern matching is performed between an average face pattern enclosed in a standard rectangular region and the processing target image, and the position in the image having a highest matching level and corresponding to the rectangular region enclosing the average face pattern is determined as the face region. Here, the pattern matching is a method for calculating the matching level between the average face pattern and the image by moving the average face pattern a bit at a time on the image, while changing the size and rotation angle on the image plane of the face pattern by predetermined amounts respectively.

Note that the method for detecting a face is not limited to this, and any method may be used, including, for example, a method that detects a rectangular region having flesh color and enclosing a face contour shape as the face region, a method that detects a region having a face contour shape as the face region, or the like. Note that, if a plurality of faces is included in a processing target image, all of the face regions are detected.

Then, from the detected face region, the information obtaining unit 32 obtains information with respect to face characteristics of the face included in the image (step ST3). More specifically, it obtains information with respect to any one of the following face characteristics: face size, face position in the image, face orientation, face rotation angle, face-to-face positional relationship when a plurality of faces is included in the image, and face detection score.

As the information with respect to face size, the number of pixels within the face region, ratio of the face region to the entire portion of the image, ratio of the face region to the width of the image, or the like may be used. In the present embodiment, the ratio of the face region to the width of the image is obtained as the face size information.

As for the information with respect face position, ratios of coordinate values of the center position of the face region (e.g., if the face region has a rectangular shape, point at the intersection of the diagonal lines) to the horizontal and vertical lengths of the image respectively, expressed in percentage values, are used. When the image is placed horizontally long, the horizontal and vertical directions of the coordinates are designated respectively as x axis and y axis with their origins at the left bottom corner. Here, if the length of the image in x direction is 100, that in y direction is 50, and coordinates of the center point of the image are (45, 15), then the face position information is (45, 30).

As for the information with respect to face orientation, information representing whether the orientation of the face included in the face region is front or side direction may be used. The face orientation may be determined by detecting eyes from the face region, in which if two eyes are detected, the face orientation is determined to be front direction, and if only one eye is detected, it is determined to be side direction. Alternatively, the face orientation may be determined by obtaining a characteristic amount representing face orientation from the face region and determining whether the face orientation is front or side direction using the characteristic amount.

The face rotation angle is a rotation angle of the face included in the face region on the image plane. Here, as for the face rotation angle, the rotation angle of the average face pattern when the face is detected by the face detection unit 30 may be used. As for the rotation angle information, information representing any one of the angles of 45 degree intervals from 0 to 360 degrees is used. Thus, the face rotation angle information is any one of 0, 45, 90, 135, 180, 225, 270, and 315. Note that if the value of actual rotation angle of the face detected by the face detection unit 30 lies between these values, the value which is closer to the actual value is used. For example, if the actual rotation angle of the face detected by the face detection unit 30 is 30 degrees, the face rotation angle is determined to be 45 degrees.

Figure 3A:
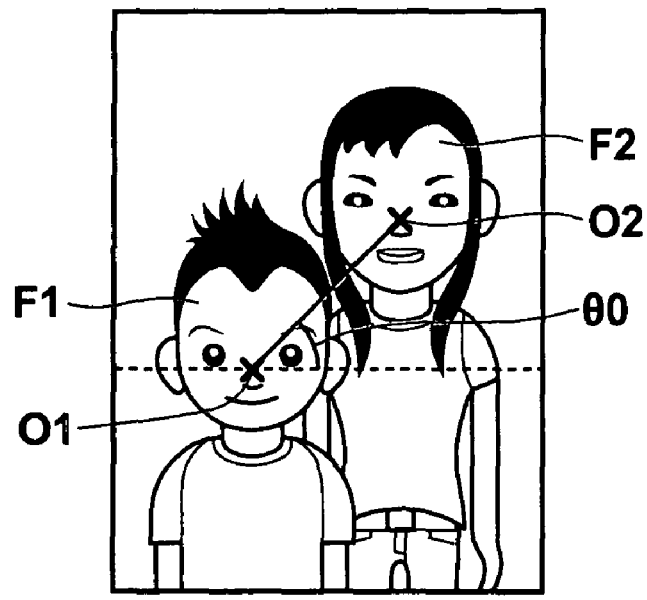
FIGS. 3A and 3B illustrate face-to-face positional relationship when a plurality of faces is included in an image.
Figure 3B:
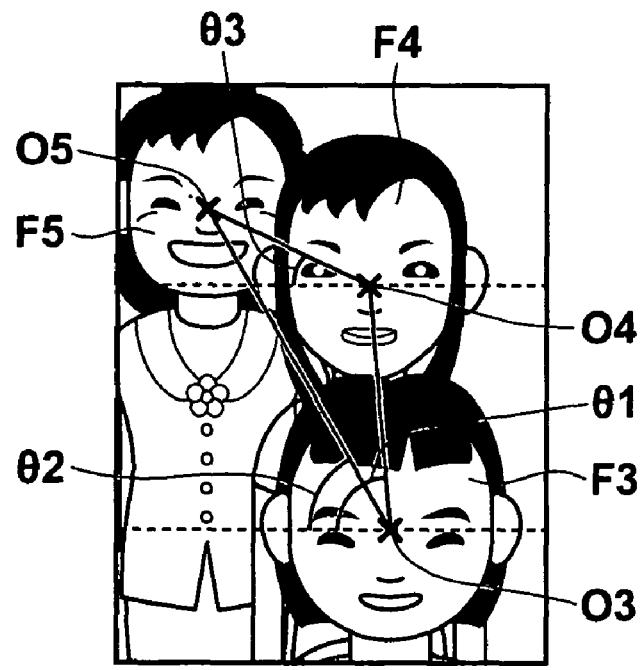

As for the face-to-face positional relationship when a plurality of faces is included, the angle formed between the line segment connecting the center point of the evaluation target face of the plurality of faces with that of each of other faces and a horizontal line of the image may be used. For example, if two faces F1, F2 are included in the image, as illustrated in FIG. 3A, the angle $\theta 0$ formed between the line segment connecting the center points O1, O2 and a horizontal line of the image may be used for either of the faces F1, F2. If three faces F3 to F5 are included in the image, as illustrated in FIG. 3B, the angle $\theta 1$ formed between the line segment connecting the center points O3, O4 of the faces F3, F4 and a horizontal line of the image, the angle $\theta 2$ formed between the line segment connecting the center points O3, O5 of the faces F3, F5 and a horizontal line of the image, and the angle $\theta 3$ formed between the line segment connecting the center points O4, O5 of the faces F4, F5 and a horizontal line of the image are obtained. Then, when the face F3 is the evaluation target, the angles $\theta 1$, $\theta 2$, when the face F4 is the evaluation target, the angles $\theta 1$, $\theta 3$, and when the face F5 is the evaluation target, the angles $\theta 2$, $\theta 3$ may be used.

As for the face detection score, the value of the matching level calculated by the face detection section is used directly.

So far, the information obtaining unit 32 may obtain information representing, for example, 30% as the face size, (45, 30) as the face position in the image, "front" as the face orientation, 0 degree as the face rotation angle, 30 degrees as the face-to-face positional relationship when a plurality of images is included in the image, and 500 as the face detection score.

Figure 4:
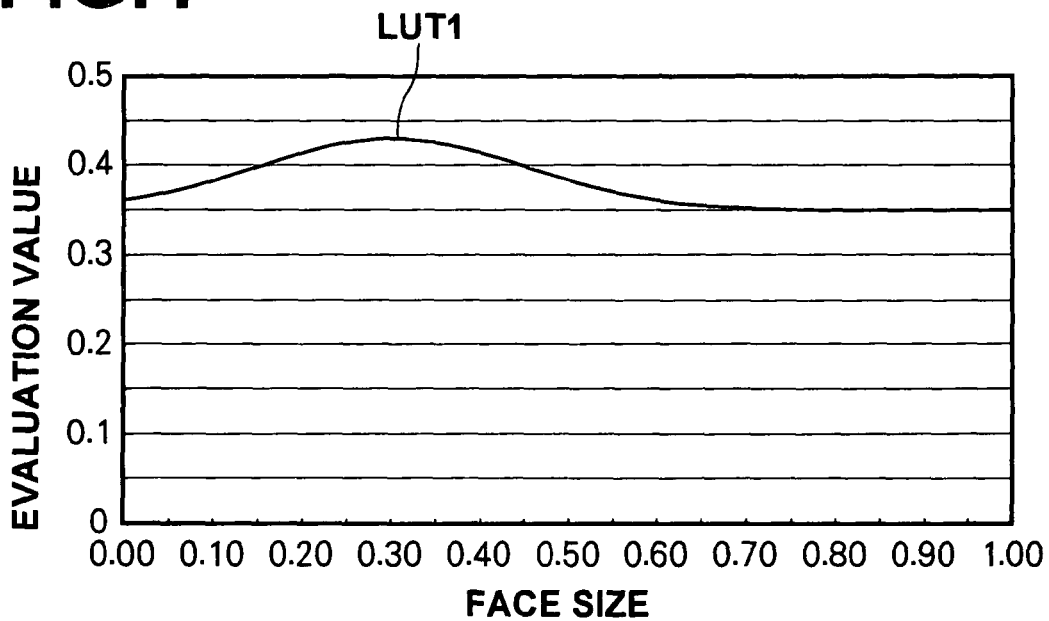
FIG. 4 illustrates an evaluation value table LUT1 for face size.
Figure 5:
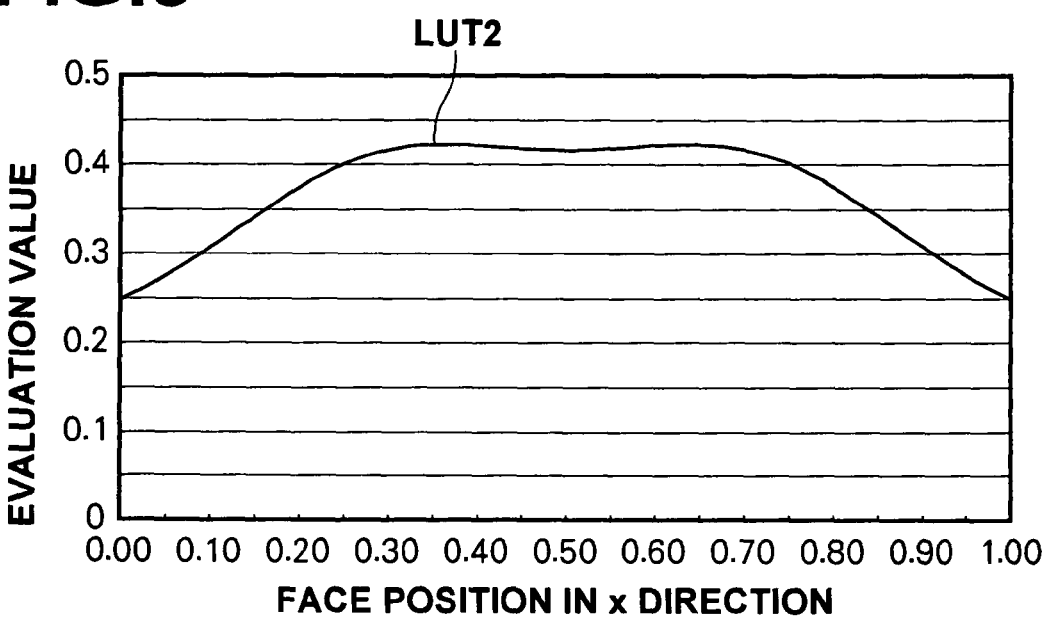
FIG. 5 illustrates an evaluation value table LUT2 for face position in x direction.
Figure 6:
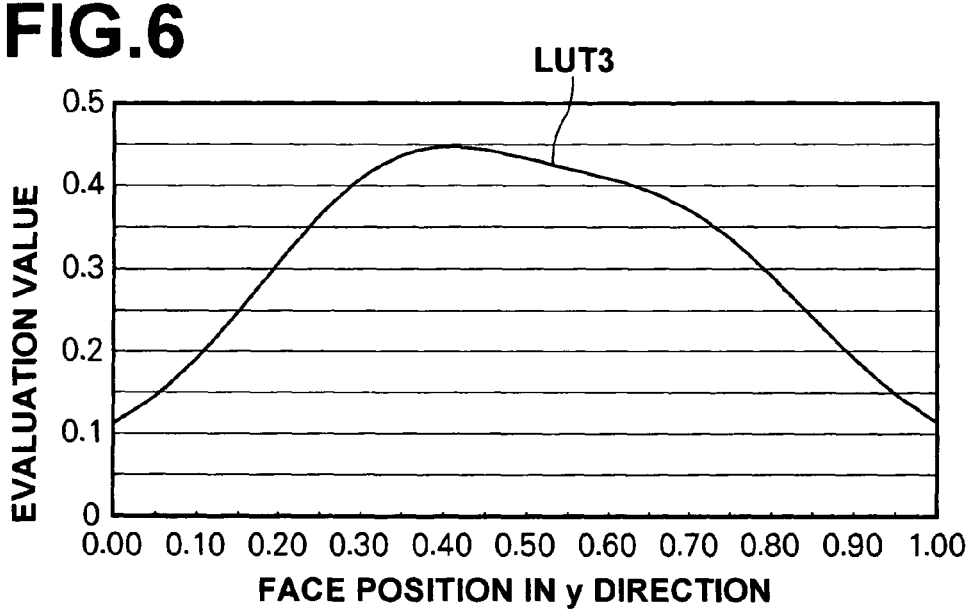
FIG. 6 illustrates an evaluation value table LUT3 for face position in y direction.
Figure 7:
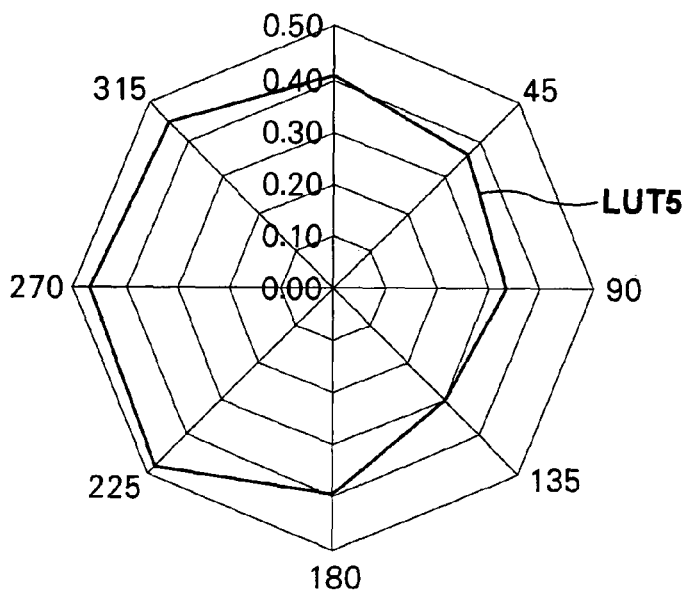
FIG. 7 illustrates an evaluation value table LUT4 for face orientation.
Figure 9:
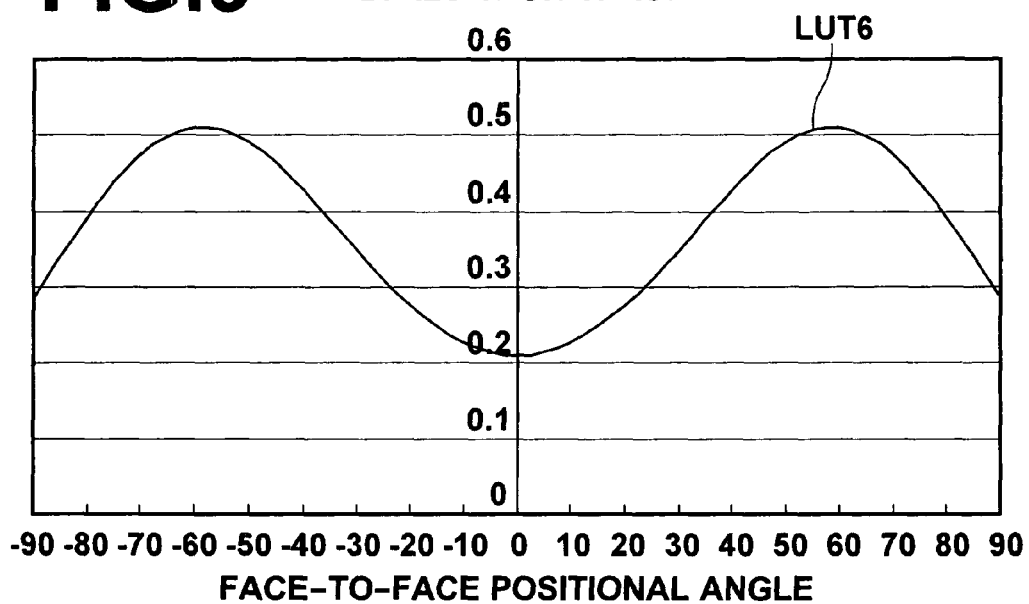
FIG. 9 illustrates an evaluation value table LUT6 for face-to-face positional relationship when a plurality of faces is included.
Figure 10:
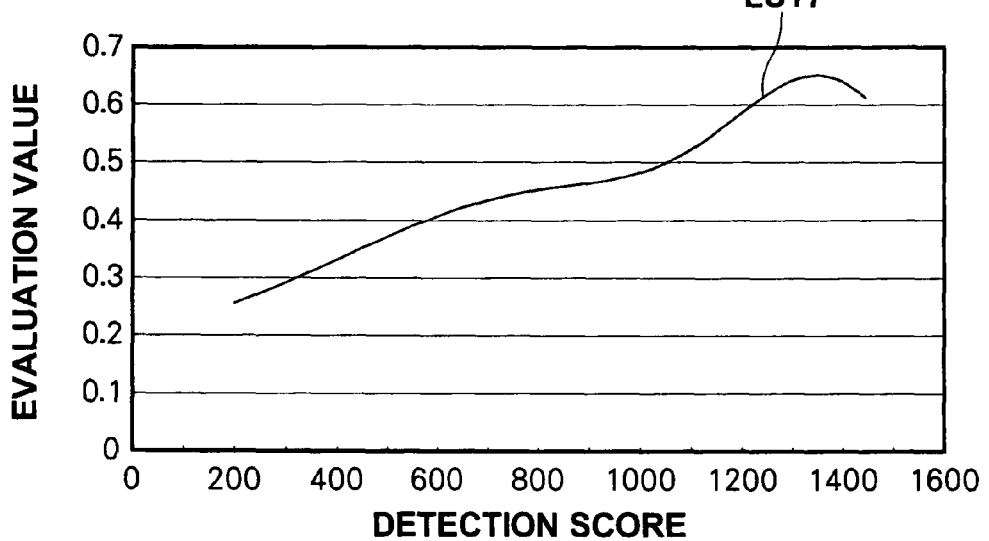
FIG. 10 illustrates an evaluation value table LUT7 for face detection score.

In the first embodiment, evaluation value tables for calculating evaluation values, which are statistically predetermined according to information representing face characteristics of faces, are stored in the hard disk 28. FIG. 4 illustrates an evaluation value table LUT1 for face size, FIG. 5 illustrates an evaluation value table LUT2 for face position in x direction, FIG. 6 illustrates an evaluation value table LUT3 for face position in y direction, FIG. 7 illustrates an evaluation value table LUT4 for face orientation, FIG. 8 illustrates an evaluation value table LUT5 for face rotation angle, FIG. 9 illustrates an evaluation value table LUT6 for face-to-face positional relationship when a plurality of faces is included, and FIG. 10 illustrates an evaluation value table LUT7 for face detection score.

These evaluation value tables are obtained in the following manner. Multitudes of sample images, which are different with each other in face size, face position, face orientation, face rotation angle, face-to-face relationship when a plurality of images is included, and face detection score, are evaluated by a plurality of evaluators to obtain evaluation values for the respective evaluation items. Then, with the values of face size, face position, face orientation, face rotation angle, face-to-face positional relationship when a plurality of faces is included, and face detection score set on the horizontal axes of the respective tables, the average values of the evaluation values for each evaluation item obtained by the plurality of evaluators are plotted on the vertical axis of each corresponding table. Here, the perfect score for the face size, face position, face orientation, and face rotation angle is 0.5, that for the face-to-face positional relationship when a plurality of faces is includes is 0.6, and that for the face detection score is 0.7.

Then, the evaluation value calculation unit 34 reads out an evaluation value table appropriate for the face characteristic from the hard disk 28 (step ST4), and calculates the evaluation value indicating the evaluation result of the image based on the evaluation value table and face characteristic (step ST5).

That is, if the face characteristic is face size, the evaluation value table LUT1 is read out, and an evaluation value E1 is calculated. If the face characteristic is face position in the image, the evaluation value tables LUT2, LUT3 are read out and evaluation values E2, E3 are calculated. For the evaluation value of the face position, the evaluation value E2 is added to the evaluation value E3 to obtain a final evaluation value. If the face characteristic is face orientation, the evaluation value table LUT4 is read out and an evaluation value E4 is calculated. If the face characteristic is face rotation angle, the evaluation value table LUT5 is read out and an evaluation value E5 is calculated. If the face characteristic is face-to-face positional relationship when a plurality of images is included, the evaluation value table LUT6 is read out and an evaluation value E6 is calculated.

Further, if the face characteristic is face detection score, the evaluation value table LUT7 is read out and an evaluation value E7 is calculated.

Next, the evaluation value calculation unit 34 determines whether or not another face region is included in the processing target image (step ST6), and if the step ST6 is negative, the process is terminated. If the step ST6 is positive, the evaluation value calculation unit 34 sets the processing target to the next face region (step ST7), and returns to step ST3 to repeat the process from step ST3 onward.

If only one face region is included in the image, the evaluation values E1, E2+E3, E4, E5, and E7 calculated in step ST5 are calculated as the final evaluation value of the image. If a plurality of face regions is included in the image, the final evaluation value is calculated through a simple addition, weighted addition, or averaging the evaluation values E1, E2+E3, E4 to E7 calculated for each face region. For the evaluation value of the face position, the evaluation value E2 is added to the evaluation value E3 to obtain the final evaluation value.

For the evaluation value E6 for face-to-face positional relationship when a plurality of images is included, evaluation values for the face-to-face positional relationship of the processing target face region with other face regions are calculated, and the average value of the calculated value is calculated as the evaluation value of the processing target face region. For example, in the case of the image shown in FIG. 3A, the positional relationship of the face F2 viewed from the face F1 is 45 degrees, so that the evaluation value E6 of the face F1 for the face-to-face positional relationship is 0.45. The positional relationship of the face F1 viewed from the face F2 is −45 degrees, so that the evaluation value E6 of the face F2 for the face-to-face positional relationship is 0.45.

In the mean time, in the case of the image shown in FIG. 3B, the positional relationship of the face F4 viewed from the face F3 is 85 degrees, so that the evaluation value is 0.35. The positional relationship of the face F5 viewed from the face F3 is 60 degrees, so that the evaluation value is 0.51. Accordingly, the evaluation value E6 of the face F3 for the face-to-face positional relationship is 0.43 which is the average value of 0.35 and 0.51. Further, the positional relationship of the face F3 viewed from the face F4 is −85 degrees, so that the evaluation value is 0.35. The positional relationship of the face F5 viewed from the face F4 is 25 degrees, so that the evaluation value is 0.32. Accordingly, the evaluation value E6 of the face F4 for the face-to-face positional relationship is 0.335 which is the average value of 0.35 and 0.32. Still further, the positional relationship of the face F3 viewed from the face F3 is −60 degrees, so that the evaluation value is 0.51. The positional relationship of the face F4 viewed from the face F5 is −25 degrees, so that the evaluation value is 0.32. Accordingly, the evaluation value E6 of the face F5 for the face-to-face positional relationship is 0.415 which is the average value of 0.51 and 0.32.

As described above, according to the first embodiment, information with respect to any one of the following face characteristics is obtained from the image: face size, face position in the image, face orientation, face rotation angle, face-to-face positional relationship when a plurality of faces is included, and face detection score, and an evaluation value statistically representing image evaluation result is calculated based on the obtained information, so that the preference of an image viewer may be reflected in the evaluation value, and thereby images may be evaluated more precisely.

In the first embodiment, any one of the evaluation values E1 to E7 is calculated using information with respect to any one of the following face characteristics: face size, face position in the image, face orientation, face rotation angle, face-to-face positional relationship when a plurality of faces is included in the image, and face detection score. But a plurality of evaluation values may be calculated using information representing a plurality of characteristics of the face characteristics of face size, face position, face orientation, face rotation angle on an image, face-to-face positional relationship when a plurality of faces is included in the image, and face detection score. In this case, the final evaluation value is calculated by performing a simple addition or weighted addition on the evaluation values calculated according to the information of the plurality of characteristics of the face characteristics of face size, face position in the image, face orientation, face rotation angle, face-to-face positional relationship when a plurality of faces is included in the image, and face detection score.

For example, if all of the evaluation values E1 to E7 for all of the face size, face position in the image, face orientation, face rotation angle, face-to-face positional relationship when a plurality of faces is included in the image, and face detection score are calculated, the final evaluation value Ef0 may be calculated by Formula (1) shown below.

$$Ef0 = \alpha 1 E1 + \alpha 2 E2 + \alpha 3 E3 + \alpha 4 E4 + \alpha 5 E5 + \alpha 6 E6 + \alpha 7 E7 \tag{1}$$

where, $\alpha 1$ to $\alpha 7$ are weighting factors.

Figure 11:
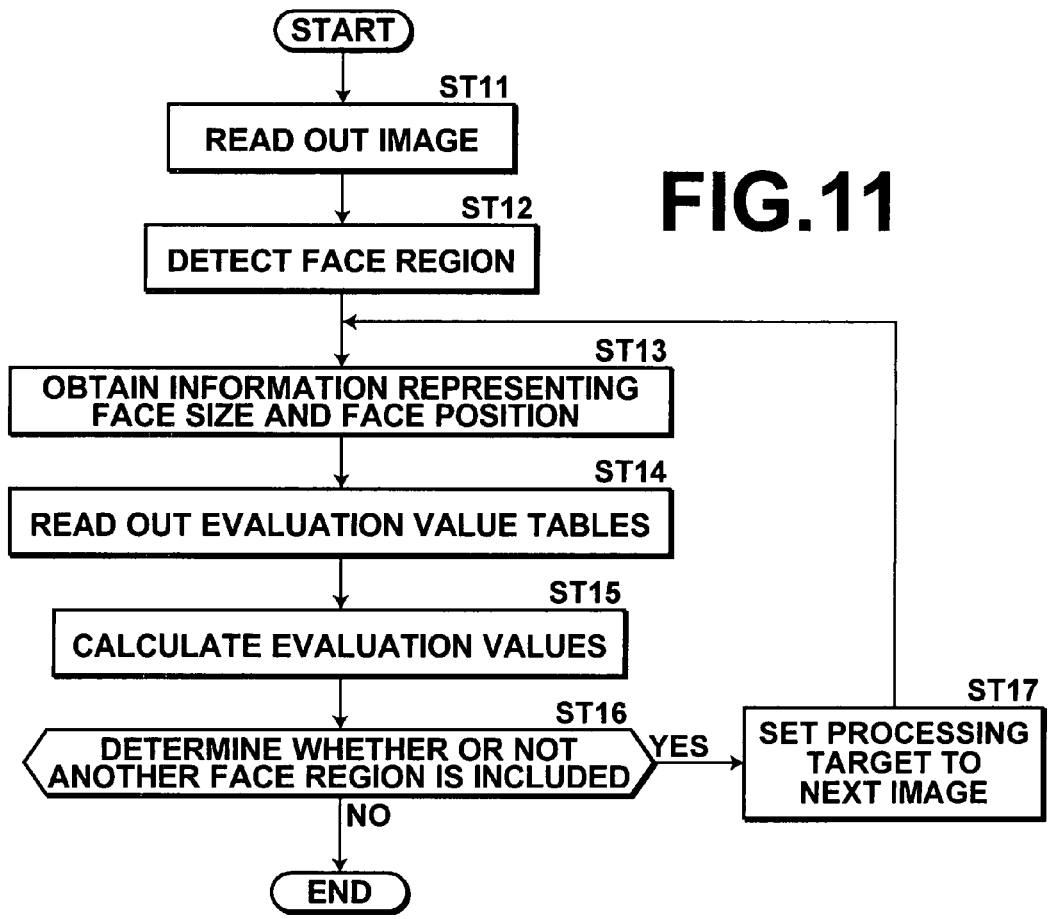
FIG. 11 is a flowchart illustrating an image evaluation process performed in a second embodiment of the present invention.

Further, an arrangement may be adopted in which information with respect to a plurality of mutually related characteristics of the characteristics of face size, face position, face orientation, face rotation angle, face-to-face positional relationship when a plurality of faces is included, and face detection score is obtained, and an evaluation result based on the information of the plurality of mutually related characteristics is calculated as the evaluation value, which will be described in a second embodiment hereinbelow. The construction of the image evaluation apparatus according to the second embodiment is identical to that of the image evaluation apparatus 1 according to the first embodiment, so that it will not be elaborated upon further here. FIG. 11 is a flowchart illustrating an image evaluation process performed in the second embodiment of the present invention. Here, description will be made of a case in which the face size and face position are assumed to be the mutually related characteristics, and an evaluation value based on the face size and position is calculated.

When an instruction to start image evaluation is given by an operator through the input unit 20, the CPU 12 initiates the process. First, the CPU 12 reads out a processing target image from the hard disk 28 (step ST11), and the face detection unit 30 detects a face region of a person from the image (step ST12).

Then, from the detected face region, the information obtaining unit 32 obtains information with respect to face characteristics of the face included in the image (step ST13). More specifically, in the second embodiment, the information obtaining unit 32 obtains information with respect to face size and face position in the image.

Figure 12:
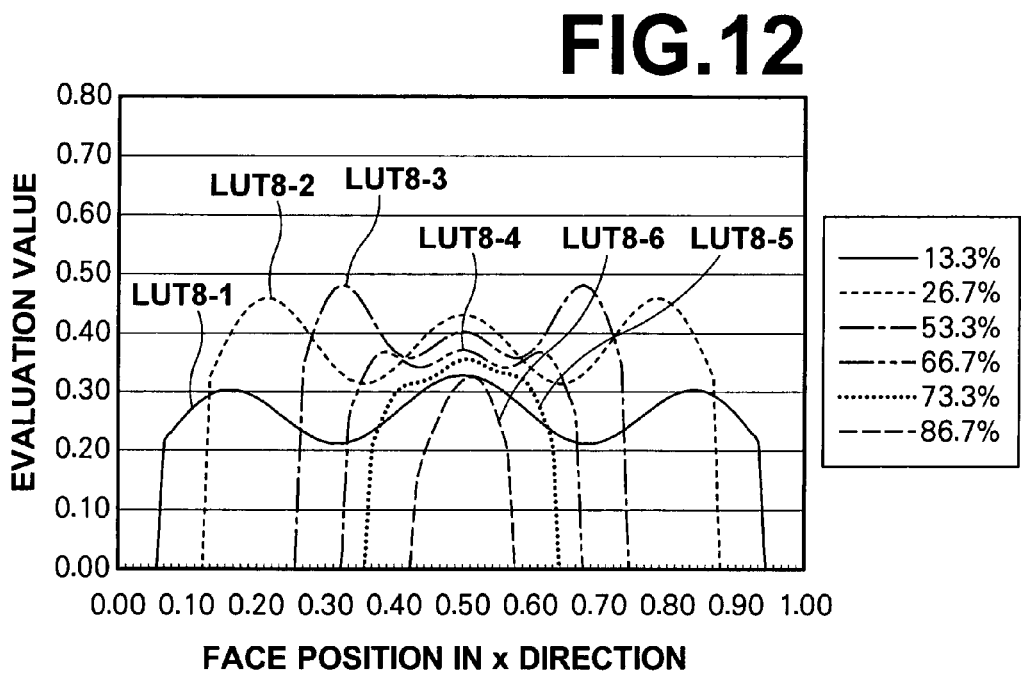
FIG. 12 illustrates an evaluation value table for face size and face position (x direction).
Figure 13:
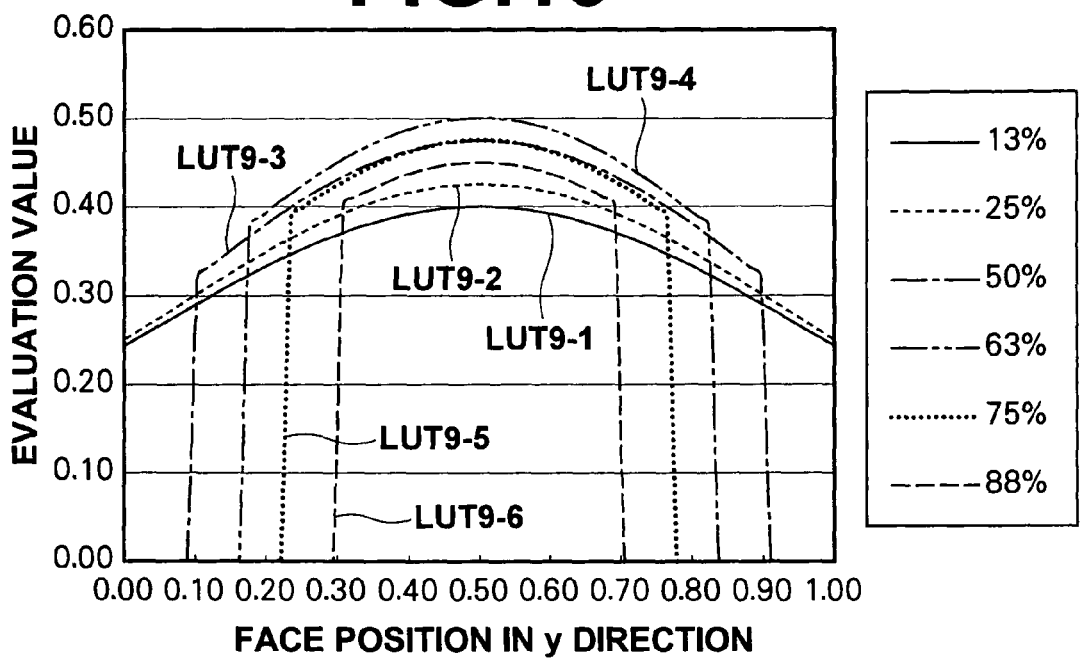
FIG. 13 illustrates an evaluation value table for face size and face position (y direction).

Here, in the second embodiment, evaluation value tables for calculating the evaluation value, which are statistically predetermined according to face size and position, are stored in the hard disk. FIG. 12 illustrates evaluation value tables LUT8-1 to LUT8-6 for face size and face position in x direction. FIG. 13 illustrates evaluation value tables LUT9-1 to LUT9-6 for face size and face position in y direction. As illustrated in FIG. 12, the evaluation value tables LUT8-1 to LUT8-6 are tables in which positions in x direction are set on the horizontal axis, and average values of evaluation values obtained by a plurality of evaluators are plotted on the vertical axis for face sizes of 13.3%, 26.7%, 53.3%, 66.7%, 73.3%, and 86.7%. Further, as illustrated in FIG. 13, the evaluation value tables LUT9-1 to LUT9-6 are tables in which positions in y direction are set on the horizontal axis, and average values of evaluation values obtained by a plurality of evaluators are plotted on the vertical axis for face sizes of 13%, 25%, 50%, 63%, 75%, and 88%.

Note that if the face sizes lie between the values shown in the evaluation value tables LUT8-1 to LUT8-6, and LUT9-1 to LUT9-6, the evaluation values are calculated by interpolation calculation using two tables having the face sizes closer to the actual value.

Next, the evaluation value calculation unit 34 reads out the evaluation value tables LUT8-1 to LUT8-6, and LUT9-1 to LUT9-6 from the hard disk 28 (step ST14), and calculates evaluation values E8 and E9 indicating the evaluation result of the image based on the evaluation value tables LUT8-1 to LUT8-6 and LUT9-1 to LUT9-6 read out from the hard disk 28 and face size and position information (step ST15). In the second embodiment, a value obtained by a simple addition or weighted addition of the evaluation values E8 and E9 is used as the final evaluation value.

Then, the evaluation value calculation unit 34 determines whether or not another face region is included in the processing target image (step ST16), and if the step ST16 is negative, the process is terminated. If the step ST16 is positive, the evaluation value calculation unit 34 sets the processing target to the next face region (step ST17), and returns to step ST13 to repeat the process from step ST13 onward.

As described above, in the second embodiment, a statistical evaluation value is calculated as the evaluation value based on the information representing face size and face position, which are mutually related characteristics. This allows image evaluation with detailed conditions, which is not feasible by face size or face position alone.

In the second embodiment, the information with respect to face size and face position is used as the information of the mutually related characteristics, but mutually related characteristics are not limited to this. The evaluation value may be calculated based on information representing any plurality number of mutually related characteristics of face size, face position in the image, face orientation, face rotation angle, face-to-face positional relationship when a plurality of faces is included, and face detection score, such as, the combination of face rotation angle and face position, combination of face size, face position, and face rotation angle, or the like. In this case, evaluation value tables may be provided in advance according to the characteristics to be used, and stored in the hard disk 28.

Next, a third embodiment of the present invention will be described. The construction of the image evaluation apparatus according to the third embodiment is identical to that of the image evaluation apparatus 1 according to the first embodiment, so that it will not be elaborated upon further here. In the third embodiment, information with respect to face size, face position in the image, face orientation, face rotation angle, face-to-face positional relationship when a plurality of faces is included, and face detection score are obtained, as well as information with respect to a plurality of mutually related characteristics of these face characteristics, and evaluation values for the individual characteristics are obtained as individual evaluation values, and an overall evaluation value, which is the final evaluation value, is calculated by performing a weighted addition on the individual evaluation values. As for the information with respect to the plurality of mutually related characteristics, information of face size and face position is used here as in the second embodiment.

Figure 14:
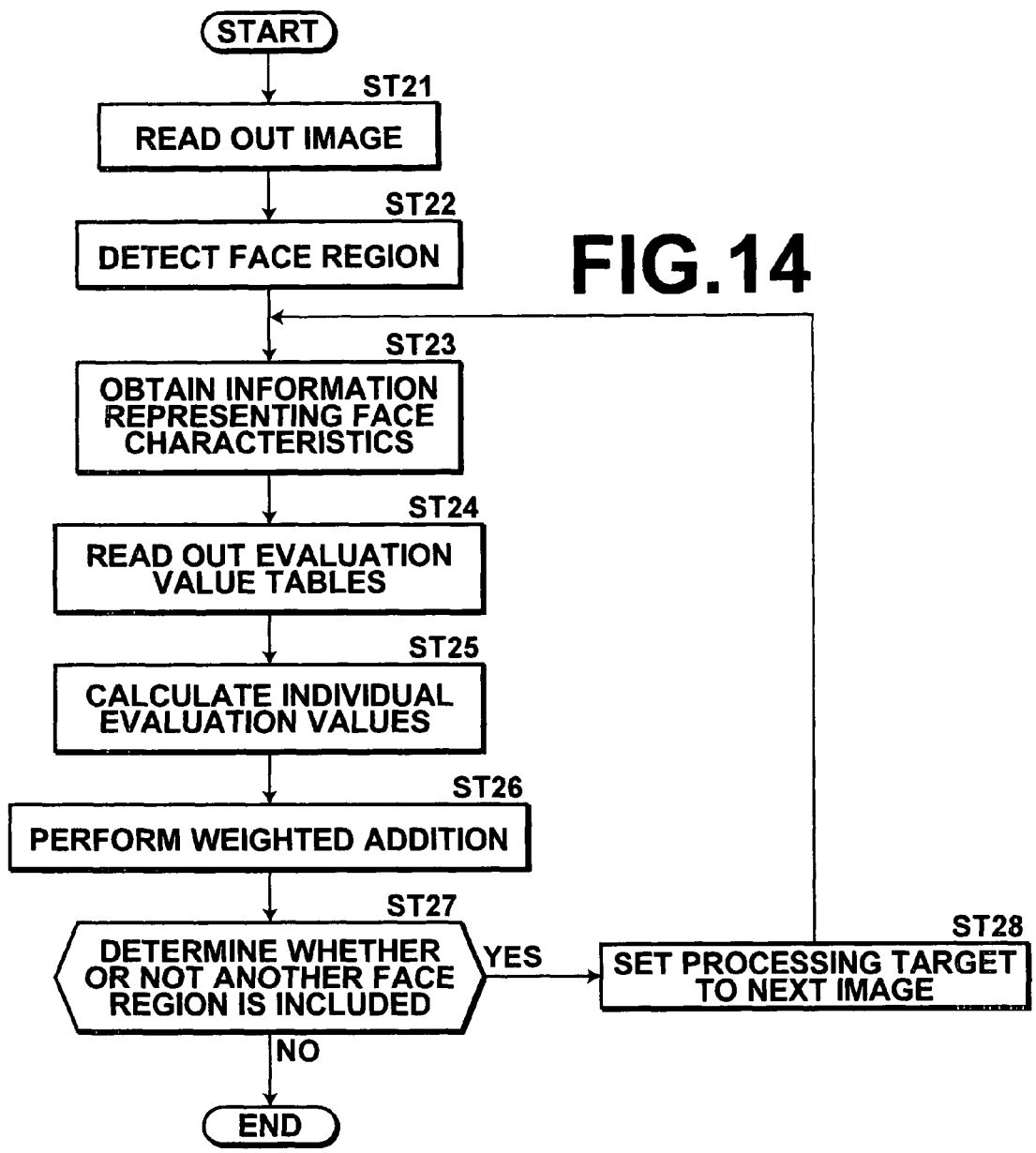
FIG. 14 is a flowchart illustrating an image evaluation process performed in a third embodiment of the present invention.

FIG. 14 is a flowchart illustrating an image evaluation process performed in the third embodiment. When an instruction to start image evaluation is given by an operator through the input unit 20, the CPU 12 initiates the process. First, the CPU 12 reads out a processing target image from the hard disk 28 (step ST21), and the face detection unit 30 detects a face region of a person from the image (step ST22).

Then, from the detected face region, the information obtaining unit 32 obtains information with respect to face characteristics of the face included in the image (step ST23). More specifically, in the third embodiment, the information obtaining unit 32 obtains all of the following face characteristics: face size, face position in the image, face orientation, face rotation angle, face-to-face positional relationship when a plurality of faces is included, and face detection score. In the third embodiment, the evaluation value tables LUT1 to LUT9-6 are stored in the hard disk 28.

Next, the evaluation value calculation unit 34 reads out the evaluation value tables LUT1 to LUT9-6 from the hard disk 28 (step ST24), and calculates individual evaluation values E1 to E9 based on the evaluation value tables LUT1 to LUT9-6 read out from the hard disk 28, and information representing face size, face position in the image, face orientation, face rotation angle, face-to-face positional relationship when a plurality of faces is included, and face detection score (step ST25). Note that the method for calculating the individual evaluation values E1 to E9 is identical to that in the first or second embodiment. Then, the overall evaluation value is calculated through a weighted addition of the calculated individual evaluation values E1 to E9 (step ST26). More specifically, the overall evaluation value Ef1 is calculated by Formula (2) shown below.

$$Ef1 = \alpha 1 E1 + \alpha 2 E2 + \alpha 3 E3 + \alpha 4 E4 + \alpha 5 E5 + \alpha 6 E6 + \alpha 7 E7 + \alpha 8 E8 + \alpha 9 E9 \quad (2)$$

where, $\alpha 1$ to $\alpha 9$ are weighting factors.

Figures 15, 16:
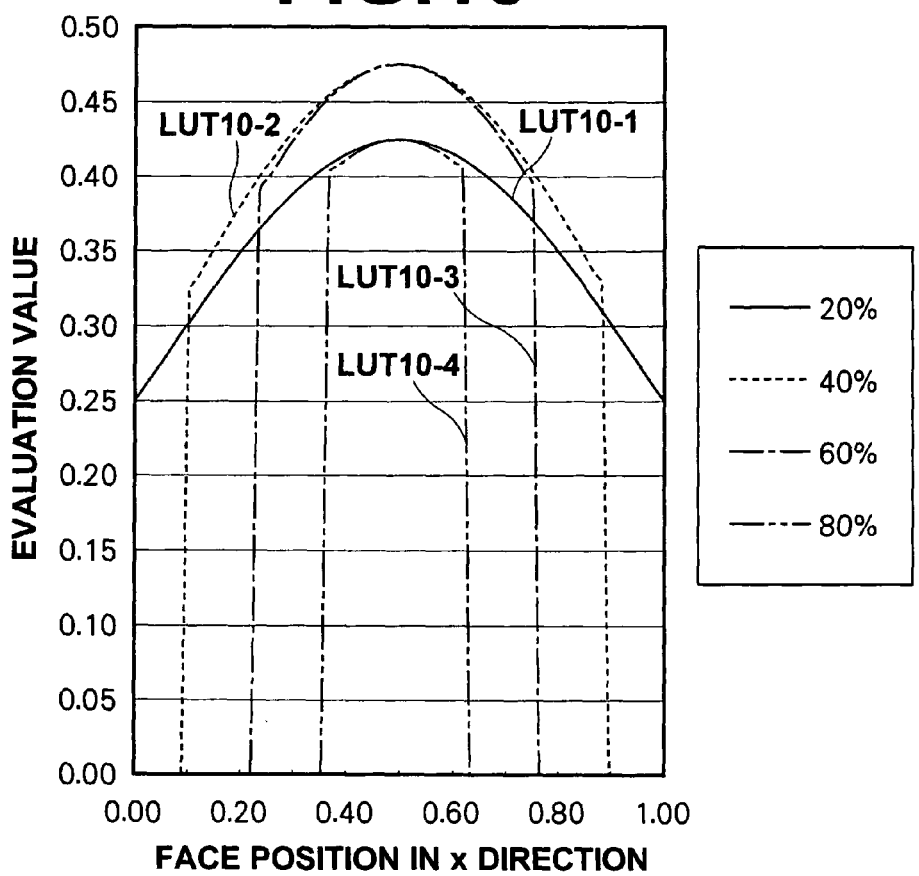
FIG. 15 illustrates a specific calculation example of an overall evaluation value Ef1.
FIG. 16 illustrates an evaluation value table for face size and face position in a vertically long image(x direction).

FIG. 15 illustrates a specific calculation example of the overall evaluation value Ef1 of an image. If the image has individual evaluation values and weighting factors shown in FIG. 15, the overall evaluation value of the image is 0.33655.

Then, the evaluation value calculation unit 34 determines whether or not another face region is included in the processing target image (step ST27), and if the step ST27 is negative, the process is terminated. If the step ST27 is positive, the evaluation value calculation unit 34 sets the processing target to the next face region (step ST28), and returns to step ST23 to repeat the process from step ST23 onward.

As described above, in the third embodiment, the overall evaluation value obtainable from individual evaluation values is calculated, so that the image evaluation may be performed more precisely.

In the third embodiment, individual evaluation values are calculated from information representing all of the face characteristics of face size, face position in the image, face orientation, face rotation angle, face-to-face positional relationship when a plurality of faces is included in the image, and face detection score, as well as information representing a plurality of mutually related characteristics of these face characteristics. But an arrangement may be adopted in which individual evaluation values are calculated using information representing at least one of the face characteristics of face size, face position in the image, face orientation, face rotation angle, face-to-face positional relationship when a plurality of faces is included in the image, and face detection score, in addition to information representing a plurality of mutually related characteristics, and the overall evaluation value is calculated through a weighted addition of the obtained individual evaluation values.

Note that, in the second and third embodiment, when calculating evaluation values for an image based on the information representing face size and face position, if the image is vertically long, the evaluation values differ from those when the image is horizontally long. Therefore, when an image is vertically long, it is preferable that the evaluation tables LUT10-1 to LUT10-4 that define the relationship between the face position in x direction and evaluation value for various face sizes illustrated in FIG. 16 be used.

So far, the apparatus 1 according to embodiments of the present invention has been described. Programs for causing a computer to function as the means corresponding to the face detection unit 30, the information obtaining unit 32, and evaluation value calculation unit 34, thereby causing the computer to perform the processes like those illustrated in FIGS. 2, 11, and 14 are further embodiments of the present invention. In addition, computer readable recording media on which such programs are recorded are still further embodiments of the present invention. In these cases, the evaluation value tables may be included in each of the programs, in the same recording medium, or supplied from an external device or separate recording medium.

What is claimed is:

1. An image evaluation apparatus, comprising:
   an information obtaining unit for obtaining information with respect to positional relationships among a plurality of faces, the information regarding the positional relationships being angles formed between line segments that connect centers of faces for which the information regarding the positional relationship is to be obtained and centers of other faces with a horizontal line within an image, and at least one of the following face characteristics from the image including a plurality of faces: a size of each face, a position in the image of each face, an orientation of each face, a rotation angle of each face, and a detection score for each face; and
   an evaluation value calculation unit for calculating an evaluation value statistically representing an evaluation result of the image based on the obtained information.

2. The image evaluation apparatus according to claim 1, wherein:
   the information obtaining unit is a means for obtaining information with respect to a plurality of mutually related characteristics among the information regarding the positional relationships among each face and other faces, at least one of the size of each face, the position in the image of each face, the orientation of each face, the rotation angle of each face, and the detection score for each face; and
   the evaluation value calculation unit is a means for calculating a statistical evaluation result, which is based on the information representing the mutually related characteristics, as the evaluation value.

3. The image evaluation apparatus according to claim 1, wherein:
   the information obtaining unit is a means for obtaining information regarding the positional relationships among each face and other faces, at least one of the size of each face, the position in the image of each face, the orientation of each face, the rotation angle of each face, and the detection score for each face, as well as information with respect to a plurality of mutually related characteristics among the above information; and
   the evaluation value calculation unit is a means for calculating an overall evaluation result obtainable from a statistical evaluation result, which is based on the information regarding the positional relationships among each face and other faces and the at least one other piece of information, and a statistical evaluation result, which is based on the information representing the mutually related characteristics, as the evaluation value.

4. An image evaluation method, comprising:
   step for obtaining information using an information obtaining unit with respect to positional relationships among a plurality of faces, the information regarding the positional relationships being angles formed between line segments that connect centers of faces for which the information regarding the positional relationship is to be obtained and centers of other faces with a horizontal line within an image, and at least one of the following face characteristics from the image including a plurality of faces: a size of each face, a position in the image of each face, an orientation of each face, a rotation angle of each face, and a face detection score for each face; and
   step for calculating an evaluation value using an evaluation value calculation unit statistically representing an evaluation result of the image based on the obtained information.

5. The image evaluation method according to claim 4, wherein:
   the information obtaining step is a step for obtaining information with respect to a plurality of mutually related characteristics among the information regarding the positional relationships among each face and other faces, at least one of the size of each face, the position in the image of each face, the orientation of each face, the rotation angle of each face, and the detection score for each face; and the evaluation value calculation step is a step for calculating a statistical evaluation result, which is based on the information representing the mutually related characteristics, as the evaluation value.

6. The image evaluation method according to claim 4, wherein:
the information obtaining step is a step for obtaining information regarding the positional relationships among each face and other faces, at least one of the size of each face, the position in the image of each face, the orientation of each face, the rotation angle of each face, and the detection score for each face, as well as information with respect to a plurality of mutually related characteristics among the above information; and
the evaluation value calculation step is a step for calculating an overall evaluation result obtainable from a statistical evaluation result, which is based on the information regarding the positional relationships among each face and other faces and the at least one other piece of information, and a statistical evaluation result, which is based on the information representing the mutually related characteristics, as the evaluation value.

7. A non-transitory computer readable recording medium encoded with computer executable instructions for causing a computer to perform an image evaluation method comprising:
step for obtaining information with respect to positional relationships among a plurality of faces, the information regarding the positional relationships being angles formed between line segments that connect centers of faces for which the information regarding the positional relationship is to be obtained and centers of other faces with a horizontal line within an image, and at least one of the following face characteristics from the image including a plurality of faces: a size of each face, a position in the image of each face, an orientation of each face, a rotation angle of each face, and a detection score for each face; and
step for calculating an evaluation value statistically representing an evaluation result of the image based on the obtained information.

8. The non-transitory computer-readable recording medium according to claim 7, wherein:
the information obtaining step is a step for obtaining information with respect to a plurality of mutually related characteristics among the information regarding the positional relationships among each face and other faces, at least one of the size of each face, the position in the image of each face, the orientation of each face, the rotation angle of each face, and the detection score for each face; and
the evaluation value calculation step is a step for calculating a statistical evaluation result, which is based on the information representing the mutually related characteristics, as the evaluation value.

9. The non-transitory computer-readable recording medium according to claim 7, wherein:
the information obtaining step is a step for obtaining information regarding the positional relationships among each face and other faces, at least one of the size of each face, a position in the image of each face, an orientation of each face, a rotation angle of each face, and a detection score for each face, as well as information with respect to a plurality of mutually related characteristics among the above information; and
the evaluation value calculation step is a step for calculating an overall evaluation result obtainable from a statistical evaluation result, which is based on the information regarding the positional relationships among each face and other faces and the at least one other piece of information, and a statistical evaluation result, which is based on the information representing the mutually related characteristics, as the evaluation value.

* * * * *